United States Patent [19]
DiGiovanni et al.

[11] Patent Number: 5,123,940
[45] Date of Patent: Jun. 23, 1992

[54] SOL-GEL DOPING OF OPTICAL FIBER PREFORM

[75] Inventors: David J. DiGiovanni, Scotch Plains; John B. MacChesney, Lebanon, both of N.J.

[73] Assignee: AT&T Bell Laboratories, Murray Hill, N.J.

[21] Appl. No.: 684,624

[22] Filed: Apr. 12, 1991

Related U.S. Application Data

[63] Continuation-in-part of Ser. No. 484,139, Feb. 23, 1990, abandoned.

[51] Int. Cl.⁵ .............................................. C03C 25/02
[52] U.S. Cl. .................................. 65/3.12; 65/3.11; 65/901; 65/60.52; 501/12
[58] Field of Search ............... 65/3.11, 3.12, 18.2, 65/60.52, 901, 18.1; 501/12

[56] References Cited

U.S. PATENT DOCUMENTS

| | | | |
|---|---|---|---|
| 2,366,516 | 1/1945 | Geffcken et al. | 117/124 |
| 2,466,119 | 4/1949 | Moulton et al. | 88/1 |
| 3,094,436 | 6/1963 | Schroder | 117/215 |
| 4,059,658 | 11/1977 | Shoup et al. | 264/43 |
| 4,165,224 | 8/1979 | Irven et al. | 65/3.12 |
| 4,323,381 | 4/1982 | Matsuyama et al. | 65/901 |
| 4,605,428 | 8/1986 | Johnson et al. | 65/18.1 |
| 4,680,046 | 7/1987 | Matsuo et al. | 65/901 |
| 4,680,048 | 7/1987 | Motoki et al. | 65/901 |
| 4,840,653 | 6/1989 | Rabinovich | 65/901 |
| 4,872,895 | 10/1989 | Fleming et al. | 65/18.1 |
| 4,921,731 | 5/1990 | Clark et al. | 427/376.4 |
| 4,941,905 | 7/1990 | Narasimham | 65/901 |
| 4,944,895 | 7/1990 | Buckley et al. | 65/18.1 |
| 4,952,225 | 8/1990 | Le Sergent et al. | 65/3.12 |

FOREIGN PATENT DOCUMENTS

| | | |
|---|---|---|
| 965243 | 11/1960 | Canada . |
| 61-270225 | 11/1986 | Japan . |
| 63-100032 | 5/1988 | Japan . |

OTHER PUBLICATIONS

*Journal of Materials Science 12*, 1977, "Preparation of Glasses and Ceramics From Metal-Organic Compounds", by B. E. Yoldas pp. 1203-1208.
*Journal of Non-Crystalline Solids 63*, 1984, "Modification of Polymer-Gel Structures", by B. E. Yoldas, pp. 145-154.
*Thin Solid Films, 77*, 1981, "Amorphous and Crystalline Dip Coatings Obtained From Organometallic Solutions: Procedures, Chemical Processes and Products", by H. Dislich and E. Hussmann, pp. 129-139.
*Journal of Non-Crystalline Solids 86*, 1986, "The Factors Affecting The Thickness of Sol-Gel Derived Silica Coatings Prepared by Dipping", by I. Strawbridge and P. F. James, pp. 381, 393.
*Journal of Non-Crystalline Solids 48*, 1982, "Sol-Gel Transition in Simple Silicates", by C. J. Brinker, K. D. Keefer, D. W. Schaefer and C. S. Ashley, pp. 47-64.
*Optical Fibers: Materials and Fabrication*, KTK Scientific Publishers/Tokyo and D. Reidel Pub. Co., Boston, 1987, by T. Izawa and S. Sudo, pp. 106-113.
*Electronics Letters*, vol. 23, No. 7, Mar. 26, 1987, "Solution-Doping Technique For Fabrication of Rare-Earth-Doped Optical Fibres", by J. E. Towsend, S. B. Poole, D. N. Payne, pp. 329-331.

*Primary Examiner*—W. Gary Jones
*Assistant Examiner*—John J. Bruckner
*Attorney, Agent, or Firm*—M. I. Finston; E. E. Pacher

[57] ABSTRACT

The method includes collapsing a silica-based glass tube to make a preform and drawing fiber from the preform. Prior to collapsing the tube, one or more glass layers are formed on the inner surface of the tube by dip-coating the surface with a sol comprising a metal alkoxide dissolved in an alcoholic or aqueous solvent, polymerizing the sol to form a gel, and drying and sintering the gel. A substantial portion the dopant, present within the sintered gel, diffuses into at least one adjoining glass region. A wide selection of dopant materials, in the form of salts or alkoxides, are readily incorporated by dissolving them in the solvent.

22 Claims, 2 Drawing Sheets

SOL-GEL DOPING OF OPTICAL FIBER PREFORM

CROSS-REFERENCE TO RELATED APPLICATION

This application is a continuation-in-part of our co-pending application Ser. No. 484,139 filed Feb. 23, 1990, now abandoned.

TECHNICAL FIELD

This invention relates to methods of manufacturing optical fibers, and more particularly, to fiber manufacturing methods involving the creation of a fiber preform having a non-uniform radial composition.

BACKGROUND OF THE INVENTION

Current methods for manufacturing optical fiber include the step of drawing the fiber from a preform. A preform is a cylindrical body having a diameter much greater than the diameter of the fiber, but having a scaled radial distribution of composition that is the same as that of the fiber that is drawn from it. Thus, the composition distribution of a fiber is determined by the steps in the fabrication of the preform. For example, typical optical fibers in current use include a core region of relatively high refractive index, surrounded by a cladding region of a different composition, having a refractive index that is lower than that of the core. To form such a fiber, the preform must have compositionally distinct regions corresponding, respectively, to the core and the cladding. To produce the regions of differing refractive index, dopants are incorporated in the glass.

In silica glass, for example, germanium is conventionally introduced as a dopant for raising the refractive index of the core glass. Phosphorus is also useful for raising the refractive index of the core glass. (In addition, phosphorus reduces glass viscosity, permitting preforms to be fabricated and fibers to be drawn at a reduced temperature.) On the other hand, fluorine is an effective dopant for lowering the refractive index of the cladding glass.

Three main processes are currently used to produce optical fibers. They are: Outside Vapor Phase Oxidation (OVPO), Modified Chemical Vapor Deposition (MCVD), and Vapor-phase Axial Deposition (VAD).

In OVPO, $SiCl_4$ vapor is hydrolyzed in a torch flame, producing a stream of fine silica particles that are deposited along the outer surface of a rotating cylindrical mandrel. Dopant vapors can be mixed with the $SiCl_4$ vapor. Thus, a core layer of relatively high refractive index is typically deposited first, using $SiCl_4$ doped with $GeCl_4$. A cladding layer having a composition adapted to yield a lower refractive index is deposited on the core layer. The mandrel is then removed, and the porous body is sintered to make the glass blank from which fibers are drawn.

In MCVD, chloride reagent gases such as $SiCl_4$ and $GeCl_4$ react homogeneously with oxygen inside a rotating glass tube, e.g., a fused quartz tube. The reaction produced by heating with an external torch produces silica particles that deposit thermophoretically on the inner wall of the tube to form a thin, porous layer. Each layer is vitrified by sintering it with heat from the same torch as it travels along the tube. The cladding material is deposited first, and then the core material. After the deposition steps are completed, the tube is collapsed to make the preform.

In VAD, as in OVPO, a stream of fine silica particles is deposited on a rotating mandrel. Here, however, particles are deposited on the end of the mandrel, and the porous preform is grown axially, rather than radially. The porous preform is pulled up through a furnace to sinter the deposited material.

When fibers for certain special applications are to be manufactured, it may be necessary to incorporate dopants other than those (e.g., $GeO_2$, $P_2O_5$, $B_2O_3$) that are added primarily to alter the refractive index of the glass. For example, optical amplifiers, including both single-pass amplifiers and lasers, can be made by doping the cores of optical fibers with rare earth ions, such as the erbium ion $Er^{3+}$, effectively making the fiber core into a laser medium. However, dopant cations, such as rare earth cations, are not as readily incorporated into the glass as are traditional dopants which are introduced as vapors or the liquid halides. Instead, special methods need to be used to dope the glass.

For example, optical fiber preforms made by the MCVD method may be doped by volatilizing and entraining dopant material, e.g., aluminum chloride, in a heated carrier gas such as helium, and adding the resulting gaseous mixture to the reactant gases within the fused quartz tube. However, although this approach is useful, it tends to produce a dopant concentration gradient along the axis of the tube, which is difficult to suppress. In addition, when making a rare-earth-doped optical amplifier, it is desirable to add mixtures of dopants, such as erbium together with aluminum or ytterbium, in order to optimize the optical properties of the amplifier. Because of differences in the volatilities of different dopant materials, the relative proportions of co-dopants present in the glass are difficult to control, and they tend to vary along the axis of the quartz tube. An additional problem is involved when dopant metals are introduced to the fused quartz tube as chloride vapors, and are to be reacted with oxygen to form metal oxides and free chlorine gas. The thermodynamic equilibrium for this reaction is unfavorable in many cases, and therefore it is difficult to incorporate many desirable dopant species by this method. On the other hand, many metal halides are refractory, and therefore cannot be readily introduced directly in the vapor phase.

As another example, desired active ions can be incorporated in the porous soot boules created by the OVPO or VAD processes by "solution doping." That is, the boule is immersed in a solution containing small amounts of dopant material, which is absorbed into the pores of the boule. The boule is then dried, dehydrated in chlorine at about 1000° C. to remove OH, and sintered to a solid preform. (MCVD preforms can also be doped in this manner. An MCVD preform is prepared for solution doping by only partially sintering a deposited layer, prior to immersion.)

This method suffers the disadvantage that it is prone to the formation of clusters and microcrystallites of dopant material. That is, because dopant material is not distributed evenly, but rather is concentrated in the pores of the preform, clusters or microcrystallites of dopant material tend to form both before sintering and during the steps when the glass body is sintered and collapsed. Although microcrystals of refractory oxides such as $Er_2O_3$, for example, may melt or dissolve during the collapse phase, diffusion is unlikely to achieve homogeneity. Consequently, regions of high $Er_2O_3$ concentration tend to remain as clusters in the preform.

Microcrystallites are undesirable because, inter alia, they can scatter light. Clusters are undesirable because they absorb light. For example, in three-level laser systems such as $Er^{3-}$, excited state absorption (ESA) reduces the laser efficiency. ESA is exacerbated if $Er^{3+}$ ions are in close physical proximity to one another, as in a cluster.

Another disadvantage of solution doping is that when the solution evaporates, it leaves behind a residue containing the starting species, e.g., $ErCl_3.6H_2O$ (or erbium oxychloride, to which the chloride is converted upon heating). However, during dehydration in chlorine at high temperature, erbium may be volatilized from the surface (i.e., near the inner surface of the deposited layer within the fused quartz tube), creating a dip in concentration near the inner surface of the porous layer. Thus, although the process is effective for doping the glass because the erbium becomes trapped in the pores, volatilization creates a dip in the dopant concentration profile at the center of the final fiber. This is undesirable because both the signal and the pump light are most intense at the center of the fiber. For the amplifier, e.g., laser, to be as efficient as possible, it is important to assure that only pump light of high intensity will interact with the dopant. This is particularly true because below a certain intensity, dopant ions will only absorb, rather than emit, optical energy, thus decreasing the amplifier's gain.

As an alternative to solution doping, porous boules created by VAD can be doped by exposure to dopant vapor, for example, to erbium chloride vapor, in a heated chamber, e.g., a chamber used for sintering. However, it is difficult to achieve high dopant concentrations by this method, and clustering, phase separation, and devitrification are potential problems.

Thus, practitioners of the art of manufacturing specially doped optical fibers have so far been unsuccessful in the search for a doping method that provides good reproducibility from preform to preform, good spatial uniformity of composition and avoids the problem of aggregation of dopant material into clusters and microcrystallites at rare earth dopant concentrations greather than 500 ppm.

SUMMARY OF THE INVENTION

The invention involves a method for manufacturing doped optical fibers, for example, optical fibers doped with rare earth ions. The method provides good spatial uniformity of composition and avoids the problem of aggregation of dopant material into clusters and microcrystallites prior to sintering.

The inventive method involves the use of polymerizable, glass-forming coatings for forming at least one region of an optical fiber. Although a currently preferred embodiment uses an alkoxide sol-gel method, the invention is not limited to such methods. For example, a suitable coating is readily formed, for purposes of the invention, by preparing a colloidal sol and allowing the sol to polymerize, forming a colloidal gel, as described, for example, in U.S. Pat. No. 4,059,658, issued to R. D. Shoup and W. J. Wein on Nov. 22, 1977. In the method of Shoup, et al., aqueous alkali metal silicates mixed with colloidal silica or quaternary ammonium silicate are gelled with organic reagents such as formaldehyde, and subsequently leached in weakly acid solutions. As a further example, aqueous silicates of, e.g., calcium, sodium, or aluminum may be coated, in solution, on a surface and polymerized in situ, forming a gel, by exposure to an acidic gas.

As noted, a currently preferred embodiment involves the use of a sol-gel process for doping, e.g., the core region of an optical preform. That is, a sol is prepared by dissolving a metal alkoxide (here called the host alkoxide) such as tetraethyl orthosilicate (TEOS) in a mixture of alcohol and water, and permitting the alkoxide to undergo hydrolysis and to begin subsequent polymerization. Dopant material, which may, for example, contain a glass modifier such as erbium or calcium, or a glass former such as titanium or aluminum, is dissolved along with the metal alkoxide. If the dopant material is, for example, a salt of a glass former, the dopant species (e.g., aluminum atoms) are taken up substitutionally at metal sites in the resulting polymeric network. If the dopant material is, by by contrast, a salt of a glass modifier, the dopant ions (e.g., $Er^{3+}$ ions) are incorporated at octahedral interstices in the polymeric network.

As one alternative to adding dopant material in the form of a salt, at least some dopant precursors are readily added in the form of alkoxides. The precursor alkoxides then react with the host alkoxide to form an organic polymer. This polymer is subsequently hydrolyzed and condensed to oxide glass as an associated complex.

In all of the above-described cases, the dopant atoms or ions are atomically mixed and uniformly distributed throughout the sol and the resulting gel, and the material remains amorphous from the gel stage to the formation of the glass.

In one embodiment, the inventive method comprises the step of providing a glass tube, e.g., a fused silica tube, and depositing a cladding layer on the inner surface of the tube by means, for example, of conventional MCVD processing. The tube is then removed from the vapor-deposition apparatus and the inner surface of the cladding layer is dip-coated with the sol. By dip-coating is meant that the sol is brought into contact with the surface, for example by filling the tube, and then drained off, leaving behind a thin layer of sol adhering to the glass surface. The thin layer is then dried and heated to dehydrate and sinter it, producing a thin, glassy layer. Dehydration is typically carried out by heating to 600°–1000° C. in mixed oxygen and chlorine for a sufficient length of time to reduce the concentration of OH (in the form of SiOH) in the resulting glass to less than 1 ppm (part per million) relative to $SiO_2$.

The OH concentration is typically determined from an optical spectrum of a fiber or preform. The loss in db/km is known as a function of the SiOH concentration. Accordingly, the loss is measured and the OH concentration inferred. For the purpose, e.g., of making erbium-doped fiber amplifiers, it is desirable to minimize the presence, at 1.38 $\mu$m, of an overtone of an Si—OH vibrational peak that can interfere with the operation of the amplifier. Reducing the OH concentration to 1 ppm is adequate for amplifier applications but possibly inadequate for optical communications over long lengths of such fiber. The treatment time is readily extended in order to reduce the OH concentration to levels characteristic of conventionally manufactured fibers for optical communication.

The core region may consist of one layer, or it may be built up by successive repetitions of the dip-coating and heating steps. Alternatively, a core layer is deposited by MCVD rather than by dip coating. A doped layer, e.g., a silicon dioxide layer doped with erbium and, e.g., aluminum or germanium, is then deposited by dip coating. During the subsequent collapsing step, the dopant migrates into the MCVD core layer by diffusion.

As an alternative to dip-coating, the sol is readily applied to the inner or outer glass surface and dried in a single step, for example, by airbrushing with or without simultaneous heating of the deposited material.

For some applications it may be desirable to form a doped layer (to serve, e.g., as a diffusion barrier) on the outside, rather than on the inside, of the cladding. To achieve that result, the dip-coating and heating steps are performed before, rather than after, the MCVD deposition of the cladding region.

After the core region has been completely deposited, dehydrated, and sintered within the tube, the tube is typically collapsed to make a preform, which is then drawn into fiber in the conventional way.

The inventive method avoids at least some of the problems associated with vapor deposition processes. For example, the composition of the material deposited according to the inventive method is very uniform along the length of the fused quartz tube. The composition of the material being deposited is readily controlled. The method provides means of incorporating dopants having low vapor pressures, and dopants whose vapors react with one another. In contrast to vapor deposition processes, multiple dopants can be added in combination, using the inventive method, without concern about differing rates of volatilization or deposition. (In particular, halide vapor with a propensity to react with oxygen will do so rapidly even at low temperature. In vapor deposition processes, this can lead to removal of dopant halide and redeposition as dopant oxide further down the tube.)

Moreover, sols can be hydrolyzed on the inner surface of the tube. This is advantageous when one of the constituent alkoxide species has a high rate of hydrolysis.

Germanium ethoxide, for example, hydrolyzes immediately upon mixing with water, producing a gel almost instantaneously. It cannot be coated onto a tube after gelation, because it is too viscous. Instead, the pure ethoxide (or, preferably, a mixture of germanium ethoxide with, e.g., TEOS) is dip-coated onto the inner surface of the tube and then hydrolyzed in situ on the glass surface by passing moist air through the tube. Typically, the air used is passed through a bubbler filled with water at 50° C. The water temperature should not be substantially greater, or else water vapor will, undesirably, condense in the tube.

The inventive method also avoids at least some of the problems associated with solution doping.

For example, gels are more likely to produce amorphous deposits of uniform composition than aqueous solutions, which are prone to deposit as crystallites of specific composition.

As a further example, the active dopant, e.g., erbium, is incorporated in such a way that clustering and crystallization are inhibited. Moreover, volatilization of the dopant-containing, e.g. erbium-containing, compound during sintering is inhibited, thereby increasing the efficiency with which the dopant is incorporated and substantially eliminating the central dip in the dopant concentration profile. Still further, materials (such as calcium, sodium, and magnesium) for which the conversion of salt to oxide is thermodynamically disfavored can readily be incorporated in a glass layer.

DETAILED DESCRIPTION OF SOME PREFERRED EMBODIMENTS

Figure 1:
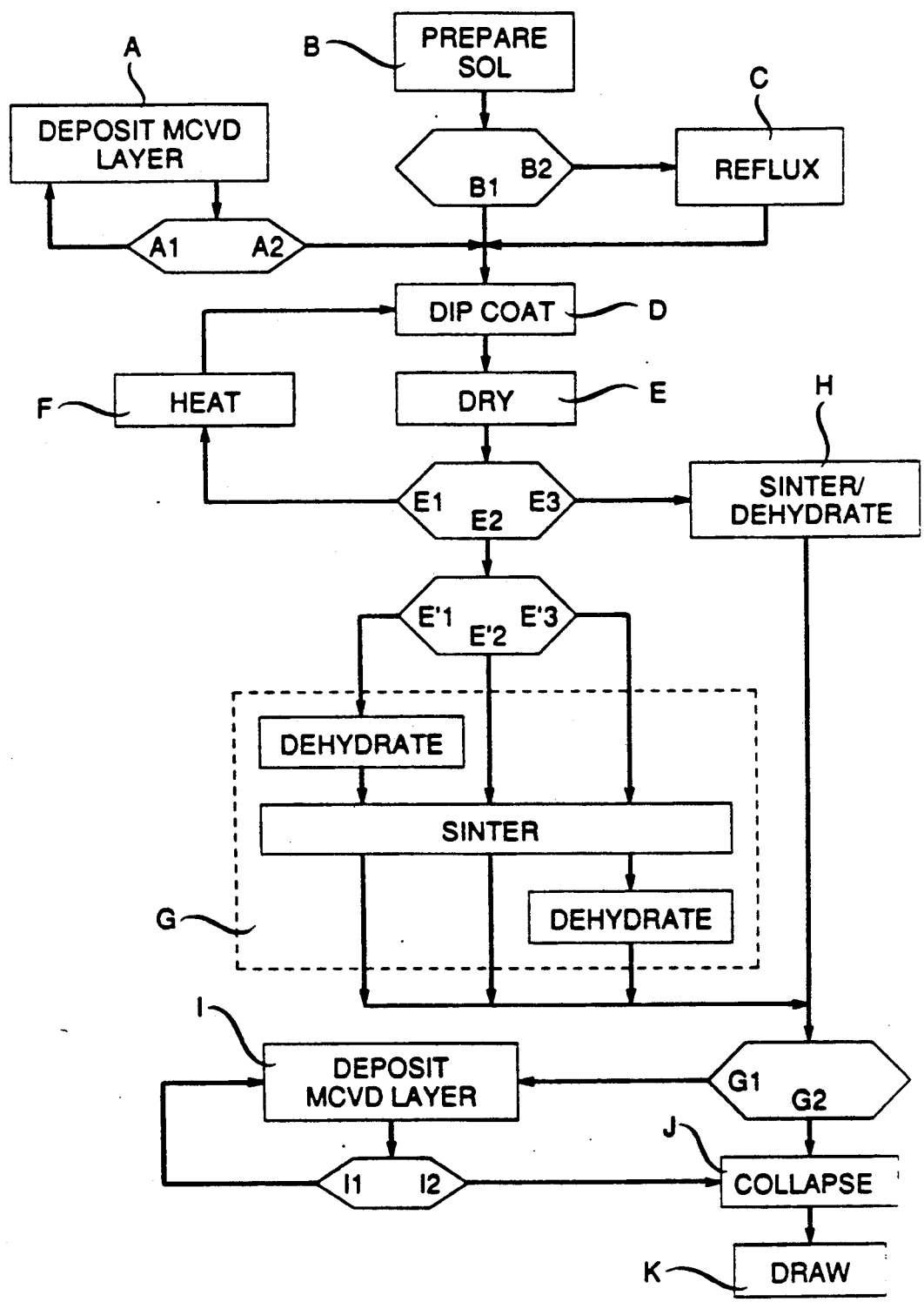
FIG. 1 is a flowchart representing at least one embodiment of the inventive method.

In a currently preferred embodiment, a sol is prepared by dissolving a metal alkoxide in a solvent which comprises water. For example, if the glass to be produced is silica glass, the metal alkoxide is a silicon alkoxide, typically tetraethyl orthosilicate (TEOS). However, other metal alkoxides are also readily used for glass formation by this method. They include: silicon methoxide, aluminum butoxide, germanium ethoxide, titanium ethoxide, aluminum 2-propoxide, tetramethyl orthosilicate, tetrapropyl orthosilicate, germanium propoxide, germanium butoxide, and germanium pentoxide.

In its general features, the preparation of the sol-gel solution is well known in the art, and is described, for example, in (I) B. E. Yoldas, *J. Materials Science* 12 (1977) pp. 1203–1208 and (II) B. E. Yoldas, *J. Non-Cryst. Solids* 63 (1984) pp. 145–154, which discuss the alkoxide technique for bulk glass articles. In order to prepare, for example, a TEOS solution for the purposes of the instant invention, the solvent will typically consist of water and alcohol (which may, for example, be methanol, ethanol, or propanol) to which additional components may be added to adjust the pH. Typically, the pH is adjusted by adding hydrochloric acid. The alcohol is added to promote miscibility between the metal alkoxide (such as TEOS) and water. However, although often convenient, the addition of alcohol is not essential in all cases.

As is well known in the art (see, for example, Yoldas (II), cited above), the pH of the metal alkoxide solution controls the morphology of the gel. That is, the gel forms spherical globules in basic solution, whereas in acidic solution it forms polymeric chains. As is also well known, the temperature affects the polymerization (i.e., the gelation) rate. The typical range of temperatures for preparing and applying the metal alkoxide solution is from room temperature (i.e., about 20° C.) to about 60° C. The higher temperature is generally preferred in order to speed up the polymerization process.

At least four categories of dopants are readily incorporated using the inventive technique. They are: active ions, refractive index modifiers, host modifiers, and glass viscosity-reducing dopants. Examples of active ions are ions of rare earth elements such as neodymium or erbium, and ions of transition metal elements such as nickel and chromium. The purpose of the active ions is to exhibit active optical properties such as stimulated emission in, for example, an optical amplifier. Examples of refractive index modifiers are aluminum, germanium, phosphorus, zirconium, and titanium, which tend to raise the refractive index, and boron, which tends to lower it. The alkali metal and alkaline earth elements are also useful as refractive index modifiers. Host modifiers are added to modify the spectral characteristics of the active ions by changing the environment of the active ion. Host modifiers may be chosen from a very wide range of elements.

Viscosity reducing dopants include lead, aluminum, boron, phosphorus, zinc, the alkali metals (e.g., lithium, sodium, and potassium), and the alkaline earth elements (e.g., magnesium and calcium). (It should be noted, in this regard, that silica glass doped with magnesium or calcium may tend to segregate into two phases, one a silica-rich phase, and the other containing roughly 60% silicon and 40% alkaline earth.) A layer at the outer surface of a fused quartz tube, either before or after it is collapsed to make a preform, can be doped, for example, with such a viscosity-reducing dopant. Upon heating, the dopant will diffuse inward. As a consequence, the collapse of the preform can be accelerated, and the draw temperature can be reduced. Reducing the draw temperature is desirable, for example, in order to reduce the occurrences of defects in glass (e.g., reduced species of silicon or dopant germanium). That is, it is desirable for each Si or Ge atom in the glass to be linked to 4 oxygen atoms. In this sense, a defect is a site of reduced coordination, e.g., to only 3 oxygen atoms. Such a defect has additional absorption and thus increases the optical loss of the fiber.

(As an alternative to viscosity reduction, it may be desirable to increase the rate of collapse by increasing the surface tension. It may be more effective to dope for increased surface tension than to dope for reduced viscosity, because the thin doped layer on the outside of the preform may not be able to inject enough viscosity-reducing dopant into the bulk glass to be effective. To increase surface tension, the most effective dopants include Al and alkaline earth elements such as Mg or Ca.)

In order to be useful for purposes of the invention, a dopant must be capable of forming either an alkoxide, or a salt that is soluble in alcohol or water. (By "salt" is meant a salt of an inorganic acid, such as erbium trichloride, as well as a salt of an organic acid, such as aluminum acetate or aluminum tartrate.) For each such dopant-containing compound, there is a preferable range of host-solution compositions, characterized by desirable ranges of the respective mole fractions of water, alcohol, and host alkoxide (e.g., TEOS). The desirable ranges are those that provide not only the desired degree of solubility of the dopant material, but also suitable viscosity for coating. That is, if the solution is too viscous, the gel layer will be too thick, and consequently, it will tend to crack or peel. Therefore, it is desirable for the viscosity to be no more than, typically, about 20 centipoise at the application temperature.

The method of adding the dopant material to the metal alkoxide solution (i.e., the host solution) depends on the chemical composition of the dopant material. If the dopant material is a salt (e.g., aluminum chloride), it is separately dissolved in water, and then the salt solution is mixed with the host solution. The mixture is then refluxed. During refluxing, the dopant reacts with the host alkoxide.

Certain alkoxides that are suitable as dopant material, such as aluminum butoxide, react rapidly with water to form, e.g., an insoluble precipitate. In such cases, the host alkoxide and the dopant alkoxide are both added to alcohol and refluxed to react the alkoxides with each other. Water (which may contain additional, dissolved additives) is then slowly added to the refluxed liquid.

If the dopant alkoxide does not react rapidly with water, it is simply added to the aqueous solvent together with the host alkoxide.

The glass tube, exemplarily a fused quartz tube, is dip-coated after the metal alkoxide and the dopant material have been added and the solution has been thoroughly mixed. The process of mixing an alkoxide is described, e.g., in H. Dislich and E. Hussman, *Thin Solids Films* 77, pp. 129-139 (1981), and in I. Strawbridge and P. F. James, *J. Non-Cryst. Solids* 86, pp. 381-393 (1986). However, before dip-coating the fused quartz tube, it may be desirable to heat the solution to promote the reaction or reactions taking place within it, although this heating step is not essential. Such a heating step is desirable, for example, in order to prevent the volatilization of germanium during dehydration and sintering. For example, in preparing a germanium-containing glass, germanium ethoxide is refluxed together with TEOS at 80° C. for about 1 hour, forming a cross-linked polymer that will inhibit loss of Ge species through volatilization. By "cross-linked" is meant that oxygen bridges are formed between the germanium and silicon atoms. The resulting Si—O—Ge structure tends to retain the germanium during subsequent pyrolysis and sintering. The solution is preferably cooled before dip-coating in order to avoid the condensation of alcohol vapor on the upper part of the tube, from which condensed alcohol can drip down the tube. The hydrolysis and polymerization reactions experienced by the alkoxide or alkoxides are described, for example, in C. J. Brinker, et al, *J. Non-Cryst. Solids* 48, p. 47 (1982). These reactions cause the viscosity of the solution to increase. At any desired value of the viscosity less than, typically, about 20 centipoise (as noted, viscosities substantially greater than this value typically cause excessive layer thickness), the solution may be dip-coated onto the fused quartz tube.

With reference to FIG. 1, step B represents the preparation of the sol, and D is the dip-coating step. Decision B2 is the choice of refluxing (step C) after step B, and decision B1 is the choice going directly from step B to step D.

Figure 2:
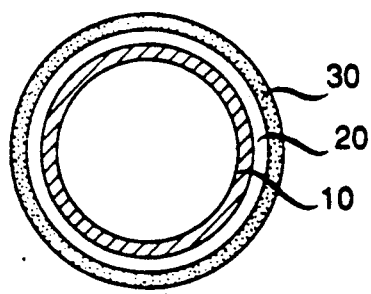
FIGS. 2–5 are schematic, cross-sectional views of silica-based glass tubes upon which glass layers have been formed according to various embodiments of the inventive method.

With reference to FIG. 2, if the dip-coated material 10 is intended to form the core of an optical fiber, a cladding layer 20 should first be formed on the inner surface of the fused quartz tube 30 by, for example, conventional MCVD deposition of one or more glass layers. Moreover, the solution to be applied by dip-coating must contain index-altering dopants such as aluminum or germanium.

If the dip-coated layer is intended to be a diffusion source, from which desired dopants will migrate by diffusion into an adjacent layer, the solution must contain the desired dopant or dopants, such as erbium.

Figure 3:
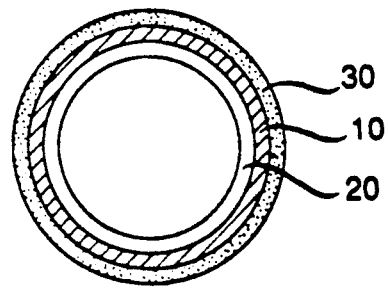

With reference to FIG. 3, if the dip-coated material 10 is intended to form only a layer around the *outside* of the cladding 20, then the fused quartz tube 30 is dip-coated, and the dip-coated layer is converted to glass, prior to any MCVD processing. Referring again to FIG. 1, step A represents MCVD deposition of at least one layer prior to dip-coating, and step I represents MCVD deposition subsequent to dip-coating.

Referring back to step D of FIG. 1, the fused quartz tube is dip-coated by bringing the solution into temporary contact with the inner surface of the tube, and then draining the solution from the tube. Momentary contact between the tube and the solution is sufficient. This operation is typically conducted at room temperature, in the presence of ambient room air. An exemplary method of dip coating is performed by supporting the fused quartz tube in a vertical position, and attaching a flexible hose between the bottom end of the tube and a reservoir containing the solution. The top end of the fused quartz tube is open to the atmosphere. Solution is forced upward into the tube by, for example, elevating the reservoir above the level of the bottom of the tube and permitting the solution to flow through the prefilled hose. After the solution has reached the desired vertical level in the tube, the solution is drained out by lowering the reservoir. The drain rate is controlled by controlling the rate at which the reservoir is lowered. If the solution is drained too quickly, the coating will be too thick and will tend to crack. By contrast, if the solution is drained relatively slowly, the coating will be thin.

While the solution is draining from the fused quartz tube, air is blown into the interior of the fused quartz tube through a small silica tube inserted through the top opening of the fused quartz tube. The stream of air displaces alcohol vapor while the coating is drying in place. It is desirable to displace the alcohol vapor in order to prevent the development of Marangoni instabilities, i.e., beading of the solvent. It is not necessary to heat the injected air. If it is heated, the air temperature should be less than about 60° C. in order to avoid boiling or igniting the alcohol. This step, which appears as step E in FIG. 1, completes the formation of the gel layer.

If a subsequent dip-coated layer is applied without an intervening heating step, the solvent of the second coating will tend to loosen the first layer, causing it to chip and peel. Therefore, if multiple gel layers are to be formed, each preceding gel layer, beginning with the first gel layer, is desirably prepared by heating it. The heating step appears as step F in FIG. 1. The fused quartz tube should be heated to about 500° C. This temperature is not hot enough to sinter the layer, but it is sufficient to set up Si—O—Si bonds, thereby creating a glass structure, and it also is hot enough to remove organic residues. During this heating step, either air or oxygen may be flowed through the quartz tube. After the heating step, the fused quartz tube is cooled and the next layer is applied by dip-coating.

After the last dip-coat layer has been applied and dried in place, the gel is converted to glass by sintering. Typically, the gel or resulting glass is also dehydrated by exposure to chlorine during heating. The dehydration step may be before, during, or after sintering. (It should be noted in this regard that there are at least three methods of core formation that involve applications of the dip-coating method. Each of these core-formation methods involves a different sequence of steps, to be referred to below.)

The sintering step is performed, for example, by first mounting the fused quartz tube in a glass lathe equipped with a 5-cm-wide oxy-hydrogen torch. An atmosphere of pure oxygen is flowed through the tube at a flow rate of about 1 liter per minute. While the tube is rotated at a rate of about 1 rotation per second, the torch flame is moved along the tube in a single pass at a rate of about 150 cm per minute, heating each portion of the tube to a maximum temperature of about 1200° C.

Sintering performed sequentially with dehydration appears in FIG. 1 as step G, and sintering performed simultaneously with dehydration appears as step H. Decision E'1 corresponds to dehydrating before sintering, decision E'2 corresponds to sintering without dehydration, and decision E'3 corresponds to dehydrating after sintering.

The dehydration step is performed, for example, by introducing chlorine into the gas flow in the fused quartz tube and heating the tube. Dehydration with chlorine is described, for example, in T. Izawa and S. Sudo, *Optical Fibers: Materials and Fabrication*, KTK Scientific Publishers, Tokyo, 1987. If a fiber is to be produced having a core doped with, e.g., erbium and either germanium or aluminum, the chlorine-to-oxygen ratio is desirably in the range 0.10–3.0, and the temperature is desirably in the range 700° C.–1000° C. If too much chlorine is present, it will react with erbium oxide to form erbium trichloride and oxygen, and erbium will be lost through volatilization. If the temperature is substantially greater than 1000° C., erbium will diffuse out of the silicon dioxide network and will react with chlorine. After heating for about fifteen minutes, the OH concentration is sufficiently reduced for fiber amplifier applications. Significantly longer dehydration times lead to detectable loss of erbium. However, because the diffusion coefficient of erbium is smaller than that of OH, improved dehydration is readily achieved while conserving erbium by heating for extended times at reduced temperature. It should be noted that for some applications, it is possible to eliminate the dehydration step and rely entirely upon the sintering step to reduce OH to tolerable levels as the glassy layer is produced. For example, the presence of more than 1 ppm of OH is tolerable in some erbium-doped fiber amplifiers if the core is sufficiently highly doped with erbium for the erbium pump absorption at 1.55 $\mu$m to be much stronger than the competing water-related absorption line centered at 1.38 $\mu$m. In this instance, dry oxygen will remove OH by equilibration.

As noted, at least three methods of core formation involve applications of the dip-coating method. In the first of these, all the core material is provided by the gel. In the second, the gel provides a diffusion source for doping an MCVD core. In the third, a porous MCVD core layer is impregnated with the sol by dip-coating.

If the gel provides all of the core material, it must include all of the core dopants. Thus for making, e.g., a fiber amplifier, the gel typically contains erbium as well as one or more refractive index-raising dopants such as aluminum, germanium, boron, or phosphorus. The dip-coating is applied to an MCVD cladding.

Figure 4:
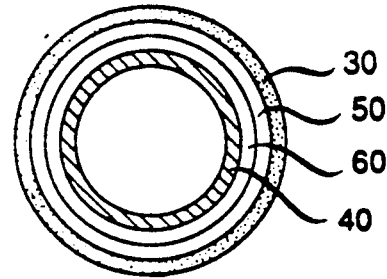

With reference to FIG. 4, if the gel is to provide a diffusion source 40, both an MCVD cladding 50 and an MCVD core 60 are first deposited. The dip-coating is then applied to the inner surface of the core layer. If, e.g., a fiber amplifier is to be made, the gel typically contains erbium, and may also contain index-altering dopant materials. This method offers the benefit that the erbium dopant is relatively concentrated in the central part of the core.

If a porous MCVD core layer is to be impregnated with gel, a conventional MCVD cladding is first produced. A core layer is then deposited by MCVD, but at lower temperature (i.e., about 1500° C., as opposed to the more typical 1900° C.) so that it is only partially sintered, leaving it porous. The porous layer is then saturated with the alkoxide solution during the dip-coating step. This method is particularly useful for doping with large concentrations of, e.g., germanium or aluminum for producing large refractive index differences. Large concentrations of these dopants cause significant changes in the thermal expansion coefficient of the glass. As a consequence, if the MCVD core layer were fully sintered, it might crack on cooling or on exposure to the sol. By contrast, the impregnation method uses a porous glass matrix and thus avoids the tendency to crack. In this case, the porous layer must be sintered at about 1800° C. in order to glassify it prior to collapse. A typical torch velocity for this sintering step is about 150 cm/minute.

The glassy layer produced by one iteration of the dip coating, drying, and sintering/dehydrating cycle is about 0.3 microns thick. If it is desired to form a thicker layer, one or more additional iterations of the complete cycle are readily performed.

If the dip coating has been used to form the core layer, then after the final gel coating has been sintered to a glassy layer, the tube is collapsed and then conventionally drawn into optical fiber.

The collapse step (step J in FIG. 1) is usually performed at a relatively slow torch velocity, typically about 2 cm/minute if multiple passes of the torch are used. The actual torch velocity varies, depending on the size of the tube.

If the dip coating method has been used prior to the formation, for example, of the cladding layer, the cladding layer is then readily formed using conventional MCVD processing. After the cladding layer is formed, the core layer is readily formed by either dip coating or MCVD processing, and the tube is then conventionally collapsed and drawn. The drawing step appears as step K in FIG. 1.

Figure 5:
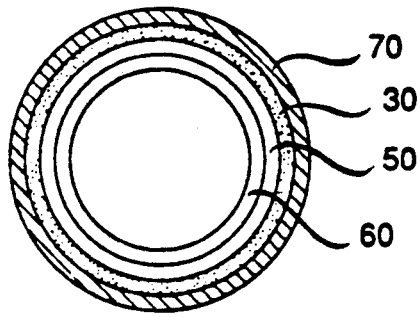

With reference to FIG. 5, if the dip coating method has been used to form a glassy layer 70 on the outside, rather than the inside, of the fused quartz tube 30, the cladding layer 50 and core layer 60 are then formed on the inside of the tube by MCVD processes, or by the dip-coating method, or by a combination of both processes, and then the tube is conventionally collapsed and drawn. Such a layer on the outside could contain titanium, for example, and thus be used to produce a compressive layer on the surface of fiber. Such a layer is known to increase strength and resistance to fatigue. (It should be noted in this regard that it is desirable to coat the outside first in order to avoid the necessity of removing the tube from the lathe between the coating and collapsing steps.)

As noted, the applied gel layer is readily used as a diffusion source, in order to dope adjacent glass regions. That is, the gel is prepared so as to contain a relatively high concentration of one or more dopant elements, which, typically, are introduced by dissolving a relevant salt or alkoxide in the solvent used to prepare the gel. After the gel has been sintered, and after any (optional) subsequent glass layers have been formed, the tube is collapsed to form a preform, and optical fiber is drawn from the preform. During the collapse stage, dopant atoms can readily diffuse out of the gel-formed layer, and migrate to a substantial depth into adjacent glass regions. As a consequence, a volume of doped glass is formed, which is greater than the volume of the gel-formed layer alone, and is doped at a correspondingly lower level than the gel-formed layer prior to such diffusion. The depth to which substantial diffusion occurs in the preform is generally greater than the original thickness of the gel-formed glass layer (after sintering), and is typically several hundred micrometers, or even more. Thus, for example, a core region of a preform, exemplarily about 1 mm in diameter, is readily made by diffusing a gel-formed layer doped with a refractive index raising element.

It should be noted in this regard that the use of a gel-formed layer as a dopant diffusion source is not limited to fused silica tubes. Glass tubes of various formulations can readily be used, including PYREX TM. Moreover, the diffusion source layer does not need to be the last-deposited glass layer. Instead, the diffusion source layer can be deposited prior to one or more MCVD and/or sol-gel layers. When the diffusion source layer is bounded on its inner surface by an additional glass layer or layers, the dopant diffusion profile will generally tend to be symmetric. That is, dopant diffusion generally occurs in substantial part during the initial stages of collapse, while the inner surface of the tube still has a relatively large radius of curvature. For that reason, the curvature will not greatly affect the relative rates of inward and outward diffusion, and barring other effects, those rates will be approximately equal.

The total depth of dopant diffusion depends on a combination of factors. These include the identity of the diffusing species, the composition of the glass host, the heat treatment of the glass tube during collapse, and the duration of the collapse process. Barring other effects, the longer the collapse process takes at a given temperature, the broader the resulting diffusion profile will be.

In general, the diffusion profile created in the resulting preform has a Gaussian-like tail extending in the radially outward direction. Associated with such a tail is a half-width at half maximum. The half-width is generally greater than the radially measured thickness of the glass region in the preform that is directly attributable to the applied gel layer. If the gel-formed layer is the innermost layer of the glass tube before collapse, then the "radially measured thickness" referred to above is simply the radius of the corresponding glass region of the preform. If a subsequent glass layer is deposited over the gel-formed layer, then the portion of the preform directly attributable to the gel-formed layer resembles a cylindrical shell, and the radially measured thickness is the shell thickness.

It should be noted in this regard that radially inward and outward diffusion generally occur together. However, in particular applications, although both inward and outward diffusion have occurred, the effective portion of the diffused region may be the inner portion or the outer portion alone. Thus, for example, the gel-formed layer may be primarily a source for inwardly diffusion doping a core portion formed from subsequently deposited material. Alternatively, the gel-formed layer may be used primarily to outwardly diffusion dope a core or cladding portion formed from previously deposited material, or from the pristine glass tube. As yet another alternative, the gel-formed layer may be used to both inwardly and outwardly dope an annular ring to serve, e.g., as a diffusion barrier.

EXAMPLE 1

A 24 mm×26 mm diameter fused quartz tube was mounted in a glass lathe. A 10-layer, matched index (i.e., having the same refractive index as $SiO_2$) cladding layer doped with phosphorus and fluorine was deposited by MCVD. The cladding had a total thickness of 200 μm. The tube was then removed from the lathe and the inner surface of the cladding layer was dip-coated with 8 layers of a sol doped with aluminum and erbium. The sol was prepared by combining:

225 g deionized water
75 g isopropanol 0.68 g $ErCl_3.6H_2O$
18 g $AlCl_3.6H_2O$ These constituents were mixed until the salts were dissolved. To the mixture, 52 g of TEOS was then added, and the mixture was refluxed for two hours, then cooled, and then used to coat the inside of the quartz tube, as described. The quartz tube was then collapsed without dehydration, overclad with a 19 mm×25 mm diameter fused quartz tube, and drawn into a 125 μm fiber. The resulting fiber had a refractive index difference Δn of 0.010, erbium optical absorption at 1.53 μm of approximately 100 db/m, and water-related optical absorption of approximately 80 db/m. By flowing pure oxygen through identically prepared tubes at an elevated temperature of about 800° C. for several hours prior to collapse, it was determined that the water-related optical absorption could be reduced to about 100 db/km.

EXAMPLE 2

A 24 mm×26 mm diameter fused quartz tube was coated with 10 matched index MCVD cladding layers, as described in Example 1. A germanium-containing core layer was deposited by MCVD using a single pass of the torch at 1500° C., with a torch velocity of 150 cm/min. The gas flow in the quartz tube consisted of $SiCl_4$ at a rate of 0.30 g/minute and $GeCl_4$ at a rate of 0.55 g/minute. The temperature of 1500° C. was not sufficient to fully sinter the core layer, and as a consequence, a porous coating was formed on the wall of the tube. The porous coating was impregnated with a sol by dip-coating. The sol was prepared by mixing:

9 g $H_2O$,
100 g propanol, and
0.24 g $ErCl_3.6H_2O$ and then adding 26 g of TEOS and refluxing for 2.5 hours. The layer was then dehydrated by heating to 900° C. for 30 minutes with a flow of 50 vol. % $Cl_2$ in $O_2$. The layer was then sintered with a single torch pass at 1800° C. with a flow of pure $O_2$. The tube was then collapsed into a preform, overclad as in Example 1, and drawn into a 100 μm fiber. The resulting fiber had a Δn of 0.024, a cutoff wavelength of 1.3 μm, optical absorption at 0.98 μm of 22 db/m, and water content too low to measure by IR absorption. The fiber was tested as an optical amplifier and gain was measured. A maximum gain of 30 db was found, using a 6-meter length of fiber pumped with 25 mW of 975 nm laser light from a Ti: sapphire laser. The gain coefficient was 1.6 db/mW.

EXAMPLE 3

A 24 mm×26 mm diameter fused quartz tube was coated with 10 matched index MCVD cladding layers, as described in Example 1. An MCVD core layer was then deposited using a flow of $SiCl_4$ at a rate of 0.73 g/minute, $GeCl_4$ at 0.88 g/minute, and $AlCl_3$ flowing through a heated injector tube at a rate of 35 $cm^3$/minute. The core layer was deposited at 1800° C., using a torch velocity of 150 cm/min. The inner surface of the core layer was then dip-coated with the sol of Example 2. As in Example 2, the coating was dehydrated at 900° C. However, the dehydration step continued for 15 minutes. The tube was then collapsed, stretched to a diameter of 5.2 mm, and then overclad twice with 19 mm×25 mm diameter tubes and drawn into a 125 μm fiber. The resulting fiber had a cutoff wavelength of 1.1 μm, a Δn of 0.020, and erbium absorption at 1.53 μm of 12 db/m. The fiber was tested as an optical amplifier, and gain was measured. A gain of 30 db was found, using a 10-meter length of fiber pumped with 15 mW of 975 nm light from a Ti: sapphire laser. The gain coefficient was 2.6 db/mW.

EXAMPLE 4

A sol was prepared by combining:
225 g deionized water
75 g isopropanol
18 g $AlCl_3.6H_2O$
0.68 g $ErCl_3.6H_2O$
52 g TEOS The resulting sol was applied in 8 coats to the inner surface of a 24 mm ×26 mm fused quartz tube, resulting in a gel thickness (after sintering) of about 0.1 μm per layer. A preform was made by collapsing the tube at 2300° C. while maintaining an internal oxygen pressure of 0.2 in. $H_2O$. The resulting preform had a core diameter, formed by aluminum diffusion, of about 1.0 mm, and a Δn of about 0.008. The central portion of the preform core corresponding to the gel-formed layer was about 0.27 mm in diameter. The preform was drawn into 125 μm-diameter fiber.

EXAMPLE 5

A sol was prepared by combining:
225 g deionized water
200 g propanol
4.1 g zirconium isopropoxide
0.034 g $ErCl_3.6H_2O$
81.5 g TEOS A preform was made substantially as described above in Example 4 using the above-described sol, and 125-μm fiber was drawn from the preform. The preform had a core diameter, due to zirconium diffusion, of about 0.8 mm, and a Δn of about 0.013.

EXAMPLE 6

A sol was prepared by combining:
45 g deionized water
90 g propanol
1.9 g $ErCl_3.6H_2O$
26 g TEOS The sol was applied in 2 coats to the inner surface of a 22 mm×25 mm fused quartz tube, resulting in a gel thickness (after sintering) of about 0.5 μm per layer. The tube was collapsed at 2300° C. The resulting preform had a core diameter (resulting from diffusion of erbium) of about 0.8 mm. The central core portion corresponding to the gel-formed layer was about 0.3 mm in diameter.

In related trials, it was observed that the diffusive behavior of germanium is similar to that of erbium.

We claim:

1. A method for manufacturing an optical fiber, comprising the steps of: providing a tube which comprises fused glass and has an inner surface; processing the tube such that a preform is created, the preform comprising a solid, glass rod and including a finished doped layer which has a final thickness; and drawing fiber from the preform, wherein the processing step comprises the further steps of:

a) providing a sol or solution which comprises a solvent and at least one polymerizable, glass-forming material, the sol or solution being capable of polymerization with respect to at least one of its components, the sol or solution further comprising, dissolved in the solvent, at least one dopant element in the form of a salt or alkoxide;

b) inducing or permitting the sol or solution to begin polymerizing;

c) applying the sol or solution to the tube inner surface before the polymerization of the sol or solution is complete, such that a thin, adherent film is formed;

d) substantially completing the polymerization of the sol or solution;

e) drying the thin, adherent film, whereby a thin layer of dried gel is formed;

f) sintering the dried gel such that an adherent, thin, glass layer which has an intermediate thickness is formed;

g) optionally forming at least one additional glass layer overlying the layer of step (f); and h) collapsing the tube such that: i) during the collapsing step, a substantial portion of the dopant element diffuses out of the layer of step (f) into at least one adjoining glass region, resulting in formation of the finished doped layer; ii) the final thickness is at least twice the intermediate thickness and iii) a concentration of said dopant is at least half maximum at a midpoint between said intermediate thickness and said final thickness.

2. The method of claim 1, wherein the polymerizable, glass-forming material is a glass-forming metal alkoxide, and the solvent comprises water and/or an alcohol.

3. The method of claim 2, wherein the metal alkoxide further comprises an element selected from the group consisting of silicon, germanium, aluminum, and titanium.

4. The method of claim 2, wherein the metal alkoxide is chosen from the group consisting of tetraethyl orthosilicate, tetramethyl orthosilicate, tetrapropyl orthosilicate, silicon methoxide, aluminum 2-propoxide, aluminum butoxide, titanium ethoxide, germanium ethoxide, germanium propoxide, germanium butoxide, and germanium pentoxide.

5. The method of claim 1, wherein the salt or alkoxide comprises a salt of a rare earth element.

6. The method of claim 5, wherein the salt of a rare earth element is selected from the group consisting of erbium trichloride and neodymium trichloride.

7. The method of claim 1, further comprising, before step (c), the step of vapor-depositing at least one glass vapor-deposited layer on the inner surface of the tube, and wherein during step (h), a substantial portion of the dopant element diffuses into the vapor-deposited layer.

8. The method of claim 7, wherein the vapor-deposited layer is a core layer.

9. The method of claim 7, wherein the vapor-deposited layer is a cladding layer.

10. The method of claim 7, wherein the vapor-depositing step comprises depositing a cladding layer by MCVD.

11. The method of claim 10, wherein the vapor-depositing step further comprises depositing a core layer by MCVD.

12. The method of claim 10, wherein the vapor-depositing step further comprises depositing a porous MCVD soot layer on the inner surface of the MCVD cladding layer, and step (c) comprises soaking the sol or solution into the soot layer.

13. The method of claim 1, wherein step (g) comprises vapor-depositing at least one glass vapor-deposited layer on the layer of step (f), and wherein during step (h), a substantial portion of the dopant element diffuses into the vapor-deposited layer.

14. The method of claim 13, wherein the vapor-deposited glass layer is a cladding layer.

15. The method of claim 1, further comprising the step of dehydrating the dried gel.

16. The method of claim 1, wherein the dopant element is a refractive index raising element.

17. The method of claim 16, wherein the refractive index raising element is selected from the group consisting of aluminum, germanium, phosphorus, zirconium and titanium.

18. The method of claim 1, wherein the dopant element is a transition metal.

19. The method of claim 1, wherein, during step (c), the viscosity of the sol or solution is less than about 20 centipoise.

20. The method of claim 1, wherein step (f) results in the formation of a glass layer about 0.3 $\mu$m thick.

21. The method of claim 1, further comprising, after step (e) and before step (f), the step of heating the dried gel to about 500° C., and applying the sol or solution to the tube inner surface at least one additional time.

22. The method of claim 1, wherein step (c) comprises applying the sol or solution by dip coating.

* * * * *